United States Patent
Escobar et al.

(10) Patent No.: US 10,982,126 B2
(45) Date of Patent: Apr. 20, 2021

(54) CHEMICAL PACKER COMPOSITION AND METHODS OF USING SAME FOR ISOLATION OF WATER/GAS ZONES

(71) Applicant: Halliburton Energy Services, Inc., Houston, TX (US)

(72) Inventors: Victor Daniel Escobar, The Woodlands, TX (US); Larry Steven Eoff, Porter, TX (US); Jacob Wayne Laufer, Midland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 13 days.

(21) Appl. No.: 16/574,552

(22) Filed: Sep. 18, 2019

(65) Prior Publication Data

US 2021/0079286 A1 Mar. 18, 2021

(51) Int. Cl.
| | |
|---|---|
| *E21B 33/134* | (2006.01) |
| *C09K 8/42* | (2006.01) |
| *C09K 8/44* | (2006.01) |
| *C04B 26/10* | (2006.01) |
| *C04B 24/38* | (2006.01) |
| *C04B 103/44* | (2006.01) |

(52) U.S. Cl.
CPC .............. *C09K 8/426* (2013.01); *C04B 24/38* (2013.01); *C04B 26/10* (2013.01); *C09K 8/44* (2013.01); *E21B 33/134* (2013.01); *C04B 2103/445* (2013.01)

(58) Field of Classification Search
CPC ........ C09K 8/426; C04B 26/426; C04B 26/10
See application file for complete search history.

(56) References Cited

U.S. PATENT DOCUMENTS

| | | | |
|---|---|---|---|
| 6,192,986 B1 | 2/2001 | Urlwin-Smith | |
| 7,703,527 B2* | 4/2010 | Sullivan | C09K 8/68 166/300 |
| 8,343,896 B2 | 1/2013 | Eoff et al. | |
| 10,174,241 B2 | 1/2019 | Eoff et al. | |
| 2007/0125534 A1* | 6/2007 | Reddy | C04B 28/14 166/277 |
| 2012/0328377 A1* | 12/2012 | Brenneis | C04B 26/122 405/267 |
| 2013/0098611 A1* | 4/2013 | Salgaonkar | C09K 8/68 166/278 |
| 2018/0209240 A1 | 7/2018 | Gupta | |

OTHER PUBLICATIONS

Eoff, Larry, et al., "Customized Sealants for Water/Gas Shutoff Operations in Horizontal and Highly Deviated Wellbore Completions," Society of Petroleum Engineers, 2015, SPE-174263-MS, pp. 1-15.

* cited by examiner

*Primary Examiner* — Silvana C Runyan
(74) *Attorney, Agent, or Firm* — Conley Rose, P.C.; Rodney B. Carroll (57) ABSTRACT

A method of treating a subterranean formation penetrated by a wellbore, comprising introducing a chemical packer composition into the wellbore, wherein the chemical packer composition comprises water, a suspending agent, a gelling agent, and a sealant composition and wherein the chemical packer composition has a pH greater than 9, and allowing the chemical packer composition to form a plug, wherein a portion of the wellbore below the plug is isolated from fluid communication with a portion of the wellbore above the plug.

26 Claims, 2 Drawing Sheets

CHEMICAL PACKER COMPOSITION AND METHODS OF USING SAME FOR ISOLATION OF WATER/GAS ZONES

FIELD

This disclosure relates to servicing a wellbore penetrating a subterranean formation. More specifically, it relates to isolating one or more zones, e.g., water and/or gas producing zones, in a wellbore with a chemical packer composition.

BACKGROUND

It is well known that wellbores pass through a number of zones within a subterranean formation other than the particular hydrocarbon zones of interest. Some of these zones may be water producing, gas producing, or both. Undesired water production, gas production, or both can affect the economic life of hydrocarbon producing wells and can potentially induce other types of problems, such as sand production, scale, and corrosion of tubulars. One of the most common methods of eliminating, or at least slowing, water and/or gas production is to introduce chemical sealants into one or more zones within the wellbore and surrounding formation. After identification of the offending zone(s), chemical sealants can be pumped into place and allowed to gel, thus stopping the in-flow of water and/or gas into the wellbore. Focusing these treatments on the water and/or gas producing zone is important because the chemical sealants are extremely efficient in terms of plugging the permeability/porosity of the formation and can damage hydrocarbon production if placed in a wrong zone (e.g., if inadvertently placed in a hydrocarbon producing zone). Most of the chemical sealants are relatively low in terms of viscosity and tend to slump, or be easily diluted. Thus in order to treat zones producing undesired fluids (water and/or gas) with chemical sealants, the zones may need to be isolated, especially in non-vertical (e.g., deviated or horizontal) portions of the wellbore.

Mechanical isolation is often a reliable method. For example, in vertical wells, sand plugs and mechanical packers can be used to isolate zones below the water and/or gas zone, while cement retainers can be used above the water and/or gas zones. However, mechanical isolation often is not feasible, either due to time, cost or wellbore constraints. For example, many horizontal wells are completed with open holes, slotted liners, or gravel packs; these completions, coupled with the often long horizontal lengths, make mechanical isolation of water and/or gas zones extremely difficult. In such cases, chemical packers may be the best option.

Therefore, a need exists for a chemical packer composition that can be pumped downhole and placed at a desired location, that has delayed viscosity/thixotropy to allow for said pumping and placement, that eliminates slumping in horizontal/deviated wellbores, and that minimizes mixing with wellbore fluids which could dilute the chemical packer system and compromise gel strength thereof.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down". For example, in a horizontal wellbore, two locations may be at the same level (i.e., depth within a subterranean formation), the location closer to the well surface (by comparing the lengths along the wellbore from the wellbore surface to the locations) is referred to as "above" the other location.

Disclosed herein are methods of treating a subterranean formation. More specifically, these are methods for isolating a water producing zone, a gas producing zone, or both in a subterranean formation penetrated by a wellbore via placement of one or more chemical packers in the wellbore that form one or more plugs in the wellbore, resulting in one or more isolated zones within the wellbore. A treatment fluid such as a sealant composition may be placed into one or more of the isolated zones to prevent the influx of water, gas, or both from the formation into the wellbore.

In embodiments, a method of treating a subterranean formation penetrated by a wellbore comprises introducing a chemical packer composition into the wellbore, wherein the chemical packer composition comprises water, a suspending agent, a gelling agent, and a sealant composition and wherein the chemical packer composition has a pH greater than 9; and allowing the chemical packer composition to form a plug, wherein a portion of the wellbore below the plug is isolated from fluid communication with a portion of the wellbore above the plug.

The chemical packer composition comprises a suspending agent. In embodiments, the suspending agent may function to prevent the chemical packer composition from settling during its storage or before reaching its downhole target (e.g., a portion of the wellbore and/or subterranean formation). In embodiments, the suspending agent as disclosed herein comprises microfine particulate material, (e.g., less than about 1 micron and also referred to as colloidal materials), clay, a viscosifying (e.g., gel forming) polymer, or combinations thereof.

In embodiments, the microfine particulate material comprises carbon black, lignite, brown coal, styrene-butadiene rubber latexes, polyvinyl alcohol latexes, acetate latexes, acrylate latexes, precipitated silica, fumed/pyrogenic silica (such as an oxidation product of $SiO_2$, $SiH_4$, $SiCl_4$ or $HSiCl_3$), surfactant micelles, or combinations thereof.

In embodiments, the clay comprises bentonite, attapulgite, kaolinite, meta kaolinite, hectorite and sepiolite, or combinations thereof.

In embodiments, the viscosifying (e.g., gel forming) polymer comprises a copolymer of 2-acrylamido-2-methylpropane sulfonic acid and N,N-dimethylacrylamide, carragenan, scleroglucan, xanthan gum, guar gum, hydroxypropylguar, hydroxyethylcellulose, carboxymethylhydroxyethylcellulose, welan gum, succinoglycan, copolymers or terpolymers of 2-acrylamido-2-methylpropane sulfonate, N,N-dimethylacrylamide, acrylic acid, and vinyl acetate; copolymers of acrylamide and trimethylammoniumethylmethacrylate, trimethylammoniumethyl acrylate salts; copolymers of 2-acrylamido-2-methylpropane sulfonate and acrylamide, or combinations thereof.

In embodiments, the suspending agent, for example a polymeric material, has a molecular weight in a range of equal to or greater than 0.5 MM Da to equal to or less than 15 MM Da.

In embodiments, the suspending agent comprises diutan.

A commercial example of the suspending agent is SA-1015™ suspension aid, which is available from Halliburton Energy Services, Inc.

In embodiments, the suspending agent is present in the chemical packer composition in an amount of from about 20 lb/1000 gal to about 100 lb/1000 gal, alternatively from about 30 lb/1000 gal to about 90 lb/1000 gal, or alternatively from about 30 lb/1000 gal to about 70 lb/1000 gal, based on total weight of the chemical packer composition.

The chemical packer composition comprises a gelling agent. In embodiments, the method as disclosed herein, wherein the gelling agent comprises a guar, hydroxypropyl guar (HPG), carboxymethyl guar (CMG), carboxymethyl hydroxyl propyl guar (CMHPG), hydroxyethyl cellulose (HEC), carboxymethyl hydroxyethyl cellulose, carboxymethyl cellulose (CMC), xanthan, pectins, diutans, or combinations thereof.

In embodiments, the gelling agent comprises hydroxypropyl guar.

A commercial example of the gelling agent is WG-11™ gelling agent, which is available from Halliburton Energy Services, Inc.

In embodiments, the gelling agent has a molecular weight in a range of equal to or greater than 1.2 MM Da to equal to or less than 5 MM Da.

In embodiments, the gelling agent is present in an amount in a range of from about 20 lb/1000 gal to about 200 lb/1000 gal, alternatively from about 30 lb/1000 gal to about 180 lb/1000 gal, alternatively from about 40 lb/1000 gal to about 160 lb/1000 gal, alternatively from about 50 lb/1000 gal to about 160 lb/1000 gal, alternatively from about 50 lb/1000 gal to about 150 lb/1000 gal, alternatively from about 60 lb/1000 gal to about 140 lb/1000 gal based on the total weight of the chemical packer composition.

The chemical packer composition comprises a sealant composition, for example a sodium silicate based gel system, a colloidal silica based gel system, or a water-soluble copolymer and cross-linker system.

In embodiments, the sealant composition comprises sodium silicate. In some embodiments, the sealant composition includes a gel system comprising a water-soluble salt and an activator. Examples of suitable water-soluble salts include without limitation an alkali metal metasilicate compound, an alkali metal silicate compound, an alkali metal aluminate, or combinations thereof. In some embodiments, the water-soluble salt comprises sodium silicate, potassium silicate, sodium aluminate, or combinations thereof, preferably sodium silicate. Examples of activators include, ethyl acetate, urea, sugar, sodium acid pyrophosphate, chloride, acetate and nitrate salts of alkali and alkaline earth metals, or combinations thereof. Reaction of the activator and the water-soluble salt, for example sodium silicate, forms an insoluble silica gel or metal silicate matrix.

In embodiments, the amount of the sodium silicate present in the chemical packer composition is in a range of from about 15% to about 75% by total volume of the chemical packer composition, alternatively from about 25% to about 75%, alternatively from about 33% to about 67%, alternatively from about 40% to about 60%.

In embodiments, the sealant composition comprises colloidal silica. In embodiments, the colloidal silica may have nanosized silica particles stabilized in an aqueous or water-miscible fluid. Stabilization of the nanosized silica particles may be accomplished using any suitable methodology for example by electrostatic repulsions with high pH or steric repulsions or by addition of adsorbing polymers. An example of a nanosilica solution that is suitable for use in the present disclosure is GASCON 469™ cement additive which is a liquid cement additive commercially available from Halliburton Energy Services, Inc. An example of the sealant composition that is obtainable from a colloidal silica solution using salt solutions is FORMSEAL™ sealant composition which is commercially available from Halliburton Energy Services, Inc.

In embodiments, the amount of the colloidal silica present in the chemical packer composition is in a range of from about 25% to about 95% by total volume of the chemical packer composition, alternatively from about 25% to about 75%, alternatively from about 33% to about 67%, alternatively from about 40% to about 60%.

In embodiments, the sealant composition comprises a water-soluble copolymer and a cross-linker. A commercial example of the sealant composition is H2Zero® service, which is available from Halliburton Energy Services, Inc.

In embodiments, the sealant composition may be used at a temperature in the range of from about 80° F. to about 250° F.; alternatively from about 90° F. to about 230° F.; alternatively from about 100° F. to about 220° F.

In embodiments, the relative amounts of the water-soluble copolymer and the cross-linker to be used in the preparation of the sealant composition can be adjusted to provide gelling within a specified time frame based on reaction conditions such as temperature and pH. For example, the amount of the cross-linker necessary for gelling is inversely proportional to temperature wherein higher amounts of the cross-linker are required at lower temperatures to effect formation of a viscous gel.

In embodiments, the water-soluble copolymer comprises at least one non-acidic ethylenically unsaturated polar monomer and at least one copolymerisable ethylenically unsaturated ester. In embodiments, the non-acidic ethylenically unsaturated polar monomer comprises acrylamide. In embodiments, the copolymerisable ethylenically unsaturated ester is formed from a hydroxyl compound and an ethylenically unsaturated carboxylic acid selected from acrylic, methacrylic, crotonic and cinnamic acids. In embodiments, the copolymerisable ethylenically unsaturated ester comprises an acrylate ester.

In embodiments, the water-soluble copolymer has a weight average molecular weight of equal to or greater than 50 k Daltons (Da). In embodiments, the water-soluble copolymer is present in the chemical packer composition in an amount of from about 2 wt. % to about 20 wt. % based on the total weight of the chemical packer composition, alternatively from about 4 wt. % to about 16 wt. %, alternatively from about 5 wt. % to about 10 wt. %. A commercial example of the water-soluble copolymer is HZ-10™ polymer, which is available from Halliburton Energy Services, Inc.

In embodiments, the cross-linker comprises a polyalkyleneimine, a poly-functional aliphatic amine, an aralkylamine or a heteroaralkylamine, or any combination thereof. In embodiments, the cross-linker comprises polyethyleneimine.

A commercial example of the cross-linker is HZ-20™ cross-linker, which is available from Halliburton Energy Services, Inc.

In embodiments, the cross-linker has a molecular weight in a range of equal to or greater than 10 k Daltons (Da) to equal to or less than 5 MM Da.

In embodiments, the cross-linker is present in the chemical packer composition in an amount of from about 0.1 wt. % to about 10 wt. % based on the total weight of the chemical packer composition, alternatively from about 0.2 wt. % to about 9 wt. %, alternatively from about 0.5 wt. % to about 6 wt. %. In embodiments, the method as disclosed herein, wherein the suspending agent comprises diutan and the gelling agent comprises hydroxypropyl guar, the sealant composition comprises a water-soluble copolymer and a cross-linker and wherein the water-soluble copolymer comprises acrylamide and an acrylate ester and the cross-linker comprises polyethyleneimine.

In embodiments, the sealant composition further comprises a particulate material, also referred to herein as a particulated sealant composition. A particulated sealant composition of the type described herein can be used as a chemical packer as described herein, as a sealant composition that is subject to a squeeze technique (e.g., squeezed into a lost circulation zone) as described herein, or both. As used herein, the term "particulate material" refers to any particles having the physical shape of platelets, shavings, fibers, flakes, ribbons, rods, strips, spheroids, toroids, pellets, tablets, or any other physical shape. The particulate materials may be included in the sealant composition to improve its mechanical properties such as tensile strength, compressive strength, resilience, rigidity, flexibility, and the like. Examples of suitable particulate materials include, but are not limited to, sand (e.g., 100 mesh), silica flour, mineral particles, thermoset polymer laminate particles, graphitic carbon-based particles, ground battery casings, ground tires, ground nut shells (e.g., walnut shells, peanut shells, and almond shells), sized-calcium carbonate particles, petroleum coke particles, vitrified shale particles, calcium clay particles, glass particles, mica particles, ceramic particles, polymeric beads, synthetic fibers (e.g., polypropylene fibers), glass fibers, mineral fibers (e.g., basalt, wollastonite, and sepiolite), and combinations thereof.

In embodiments, the sealant composition has a multimodal particulate material distribution. The sealant compositions having a multimodal particle size distribution may have a bimodal particle size distribution, trimodal particle size distribution, or other suitable particle size distribution as desired, inter alia, on the particular application. In embodiments, the particulate material has a weight mean particle size in the range of from about 20 microns to about 1,500 microns.

In embodiments, the particulate material comprises resilient particles, thermoset polymer laminate particles, or combinations thereof. In embodiments, at least a portion of the thermoset polymer laminate particles are platelets.

Commercial examples of suitable sized-calcium carbonate particles having a weight mean particle size in the range of from about 25 microns to about 400 microns include BARACARB® 25 sized-calcium carbonate, BARACARB® 50 sized-calcium carbonate, and BARACARB® 150 sized-calcium carbonate, which are commercially available from Halliburton Energy Services, Inc. In some embodiments, the graphitic carbon-based particles may comprise graphite and a carbon matrix. In certain embodiments, the graphite may be present in the graphitic carbon-based materials in an amount of at least about 20% by weight and, in other embodiments, in an amount of from about 80% to about 95% by weight. Other examples of suitable thermoset polymer laminate particles include those that comprise melamine formaldehyde or urea-formaldehyde type of thermoset polymers. Commercial examples of melamine-formaldehyde type of thermoset polymer laminates include FORMICA® laminate from Formica Corporation and PHENOSEAL® ground laminate from Forta Corporation. PHENOSEAL® ground laminate is available in Fine, Medium, and Coarse grades. In some embodiments, the Fine Grade material, about 55% by weight of which passes through a 250 micron (60 mesh) screen, is used. The appropriate type and amount of each portion of particles to include in the sealant composition may vary dependent upon a variety of factors, including formation characteristics and conditions, such as circulation loss rates, fracture geometry, and the like.

In embodiments, the resilient particles may comprise a resilient graphitic carbon-based material. Graphitic carbon-based materials generally are considered resilient if they have a resiliency of at least about 20% after compression at 10,000 psi. As used herein, the term "resiliency" refers to the percentage increase in sample volume after release of a compaction pressure and is defined by the following formula:

$$\% \text{ Resiliency} = 100\left(\frac{h_r}{h_o} - 1\right)$$

wherein $h_o$ is the height of a column of the material being tested under the compaction pressure, and $h_r$ is the height of the column of the material being tested after the compaction pressure is released.

Commercial examples of suitable resilient carbon-based materials having a weight mean particle size in the range of from about 25 microns to about 400 microns include STEELSEAL® carbon additive and STEELSEAL FINE® carbon additive, which are commercially available from Halliburton Energy Services, Inc. In some embodiments, at least about 30% by weight of the desired portion of particles is resilient particles, thermoset polymer laminate particles, or a combination thereof.

Examples of suitable fibers include but are not limited to mineral fibers such as WOLLASTOCOAT® mineral fibers commercially available from NYCO Minerals, Inc. of Willsboro, N.Y. and BAROFIBRE® fibers from Halliburton Energy Services, Inc. and glass fibers such as commercially available CEM FIL® fibers available from Saint Gobain, Vetrotex of Madrid, Spain.

Sufficient amounts of particulate materials may be added to the sealant composition to improve the effectiveness of the sealant composition in reducing or preventing circulation losses and withstanding increased pressures. In certain embodiments, the particulate materials may be present in the chemical packer composition in an amount between about 5% to 35% by weight of the chemical packer composition.

In embodiments, the method as disclosed herein, wherein the water can be selected from the group consisting of freshwater, seawater, saltwater, or brines (e.g., natural brines, formulated brines, etc.), and any combination thereof. The formulated brines may be produced by dissolving one or more soluble salts in water, a natural brine, or seawater. Representative soluble salts include the chloride, bromide, acetate, and formate salts of potassium, sodium, calcium, magnesium, and zinc. Generally, the water may be from any source, provided that it does not contain an amount of components that may undesirably affect the other components in the chemical packer composition.

In embodiments, the water is present in the chemical packer composition in an amount of from about 70 wt. % to about 97 wt. % based on the total weight of the chemical packer composition, alternatively from about 75 wt. % to about 95 wt. %, alternatively from about 80 wt. % to about 90 wt. %.

In embodiments, the chemical packer composition can be thixotropic. Being thixotropic means having a property of thixotropy, which is a time-dependent shear thinning property. When a stress is applied (being shaken, agitated, sheared or otherwise stressed) to a thixotropic fluid, the thixotropic fluid becomes thin and less viscous over time; after the stress stops, it will take a finite time for the thixotropic fluid to return to a viscous state. In some embodiments, the chemical packer is effectively thixotropic to be pumped downhole, and upon cessation of the pumping exhibits increasing gel strength to form a rigid gel plug.

In embodiments, the method as disclosed herein, wherein introducing the chemical packer composition into the wellbore comprising pumping the chemical packer composition into the wellbore and wherein the chemical packer composition has a viscosity in a range of from about 30 cp to about 500 cp during the pumping. In embodiments, upon cessation of the pumping, the chemical packer composition forms a gel within about 60 seconds from the cessation of the pumping. In embodiments, the gel crosslinks to form a rigid gel within about 60 minutes from the cessation of the pumping.

In embodiments, the chemical packer composition can be made by a method comprising: placing a mixture comprising water, a suspending agent, a gelling agent, and a sealant composition into a container, blending the mixture until the mixture becomes a homogeneous fluid (e.g., a pumpable slurry), and optionally measuring the pH of the mixture to make sure the pH is equal to or greater than 9. The container can be any container that is compatible with the mixture and has sufficient space for the mixture. A blender can be used for blending. In some embodiments, the chemical packer composition can be prepared at the wellsite. For example the solid components of the chemical packer composition can be transported to the wellsite and combined (e.g., mixed/blended) with water located proximate the wellsite to form the chemical packer composition. In some embodiments, the solid composition of the chemical packer composition can be prepared at a location remote from the wellsite and transported to the wellsite, and, if necessary, stored at the on-site location. If transported to and/or stored at the wellsite, the transportation and/or storage vessel should have an agitator, rotor, mixer, or the like to impart sufficient shear to the thixotropic chemical packer composition to maintain a flowable, pumpable composition (e.g., slurry).

When it is desirable to prepare the chemical packer composition on the wellsite, the solid composition of the chemical packer composition along with additional water and optional other additives can be added into a container (e.g. a blender tub, for example mounted on a trailer), and the mixture is then blended until the mixture becomes a homogeneous fluid (e.g., a pumpable slurry). In embodiments, additives may be added to the chemical packer composition during preparation thereof (e.g., during blending) and/or on-the-fly by addition to (e.g., injection into) the chemical packer composition when being pumped into the wellbore. Before being pumped into the wellbore, the pH of the chemical packer composition optionally can be measured to make sure the pH is greater than 9. Alternatively, the approximate pH of the chemical packer composition will be known based upon the "recipe" thereof (e.g., the relative amounts of constituent components thereof).

In embodiments, a conduit (e.g., a tube) can be used to introduce the chemical packer composition into the wellbore. Before pumping the chemical packer composition, the conduit can be placed into the wellbore so the exit of the conduit is at the location where the chemical packer composition is designed to be used. Then the chemical packer composition is pumped through the conduit into the wellbore. In the scenario where two amounts of the chemical packer composition is used at different locations in the wellbore, the two amounts of the chemical packer composition can be prepared together or separately. When the two amounts of the chemical packer composition are prepared together, after the first amount of the chemical packer composition is pumped into the wellbore, shear (e.g., via blending/mixing) can be applied to the remaining second amount of the chemical packer composition on the wellsite so that the second amount of the chemical packer composition remains pumpable. In embodiments, after preparation of the chemical packer composition, shear (e.g., via blending/mixing) can be applied to the chemical packer composition whenever necessary, so that the chemical packer composition is kept pumpable on the wellsite.

A scenario where isolation may be needed is shutting off water producing zones, gas producing zones, or both while drilling. Often during the drilling process high pressure water and/or gas zones are encountered, which may hamper or restrict continued drilling operations and the ability to extend casing strings to desired depths. It is desirable to treat these zones to restrict this water and/or gas flow into the wellbore, and isolation may be necessary in order to place the treatment only in these water/gas influx zones. In these situations, it is not practical or perhaps feasible to set mechanical devices in an open hole section to provide isolation. This is due to the irregular nature of the drilled formation, or the size of the wellbore. Thus a chemical packer, which can be pumped down drillpipe, can be the best option to isolate these water/gas influx zones.

During drilling, when a water/gas influx zone is encountered (for example a high pressure water producing zone, a high pressure gas producing zone, or both), water, gas, or both can flow, via one or more flow paths present in the subterranean formation, from the formation through the wellbore wall into the wellbore. This will dilute the drilling fluid inside the wellbore and thus make the drilling fluid less effective, and this also causes other issues that may hamper or restrict continued drilling operations and the ability to extend casing strings to desired depths. It is desirable to treat the water/gas influx zones to restrict this flow of water, gas, or both, and isolation may be necessary in order to place the treatment only in these influx zones. In some embodiments, a mechanical packer cannot be used for example because the zone encountering water/gas influx into the wellbore can be an open hole, the shape of the wellbore can be irregular, the size of the wellbore can make mechanical packer difficult to place into the targeted treating place in the wellbore, or combinations thereof.

In embodiments, a method of treating a subterranean formation penetrated by a wellbore comprises: introducing a chemical packer composition into the wellbore, wherein the chemical packer composition comprises water, a suspending agent, a gelling agent, and a first sealant composition and wherein the chemical packer composition has a pH greater than 9; allowing the chemical packer composition to form a plug, wherein a first portion of the wellbore below the plug is isolated from fluid communication with a second portion of the wellbore above the plug; penetrating the plug with a conduit; and flowing a treatment fluid from the conduit into the first portion of the wellbore. In embodiments, the suspending agent comprises diutan, the gelling agent comprises hydroxypropyl guar, and the first sealant composition comprises polyethyleneimine and a polymer comprising acrylamide and an acrylate ester.

In embodiments, the conduit can be drill pipe or coiled tubing. In one scenario, the chemical packer composition can be pumped down through drill pipe to the targeted treating area to form a gel plug. This gel plug will isolate the water/gas influx zone below the gel plug from the zone above the gel plug, so that the influx of water, gas, or both is stopped from flowing past the plug and further up the wellbore toward the surface. Then the drill pipe can continue to push through the plug, and inject a treatment fluid (e.g., a second sealant composition, which may be the same or different from the sealant compositions disclosed herein) below the plug to treat the targeted water/gas influx zone.

In another scenario, the drill pipe is pulled out of the wellbore and coiled tubing can be placed into the wellbore to the targeted treating area instead of the drill pipe. The chemical packer composition is then pumped through the coiled tubing, and allowed to exit into the wellbore to form a gel plug. This gel plug will isolate the water/gas influx zone below the gel plug from the zone above the gel plug, so that the influx of water, gas, or both is stopped from flowing past the plug and further up the wellbore toward the surface. Then the coiled tubing can continue to push through the plug, and inject a treatment fluid (e.g., a second sealant composition, which may be the same or different from the sealant compositions disclosed herein) below the plug to treat the targeted water/gas influx zone.

In embodiments, the first portion of the wellbore can be uncased, since the water/gas influx zone can be encountered before the placement of casing, and the drilling operation has to be paused before treatment to the water/gas influx zone.

In embodiments, the first portion of the wellbore comprises one or more flow paths from the subterranean formation into the wellbore for the influx of water, gas, or both from the subterranean formation into the wellbore. The pressure of the water/gas influx zone can be higher than the pressure of the fluid inside the wellbore, and water, gas, or both results in the formation of flow paths from inside the subterranean formation into the wellbore. This undesired influx of water, gas, or both will dilute the fluid (e.g., drilling fluid) inside the wellbore, and the wellbore wall and/or filter cake can also be destroyed by the influx of water, gas, or both. In embodiments, the treatment fluid comprises a second sealant composition and the second sealant composition is further flowed into the one or more flow paths providing for the influx of water, gas, or both. As the treatment fluid (e.g., a second sealant composition) is pumped into the water/gas influx zone, it fills up the space in the wellbore, and upon the application pressure by pumping, it will flow into the flow path for the influx of water, gas, or both in the subterranean formation around the wellbore (i.e., the second sealant can be "squeezed" into the surround subterranean formation via the application of hydraulic pressure).

In embodiments, the second sealant composition may be the same or different than the first sealant composition. The second sealant composition can be a thixotropic fluid, which can be pumped into the wellbore, and form a gel thereafter. In some embodiments, the second sealant composition is a crosslinkable sealant composition. In some embodiments, the second sealant composition comprises a cementitious composition comprising water and one or more cementitious materials that can set to form a solid, hard mass. In embodiments, the second sealant composition comprises cement, an epoxy resin, or combinations thereof. In embodiments, the cement can be Portland cement, pozzolana cement, gypsum cement, shale cement, acid/base cement, phosphate cement, high alumina content cement, slag cement, silica cement, high alkalinity cement, magnesia cement, or combinations thereof. The epoxy resins, also known as polyepoxides, are a class of reactive prepolymers and polymers which contain epoxide groups. The epoxy resins can cross-link (react) either with themselves through catalytic homopolymerisation, or with a wide range of co-reactants including polyfunctional amines, acids (and acid anhydrides), phenols, alcohols and thiols (usually called mercaptans). An example of the second sealant composition is H2Zero® service, which is a porosity fill sealant for controlling unwanted fluid production that is commercially available from Halliburton Energy Services, Inc.

In embodiments, the method as disclosed herein further comprises allowing the second sealant composition to seal and close the flow path to further influx of water, gas, or both into the wellbore. After the second sealant composition becomes static in the space it fills (e.g., one or more influx flow paths from the formation into the wellbore), it can form a gel, crosslink, and/or set to seal and close the flow path to further influx of water, gas, or both into the wellbore.

In embodiments, a method of treating a subterranean formation penetrated by a wellbore, comprises: drilling the wellbore with a drill bit connected to drill pipe; determining a location of an influx flow path from the subterranean formation into an uncased portion of the wellbore providing for an undesirable influx of water, gas, or both from the subterranean formation into the uncased portion of the wellbore; upon discontinuing drilling, introducing, via the drill pipe, a chemical packer composition into at least a portion of the uncased portion of the annular space between the wellbore wall and the outer surface of the drill pipe above the location of the influx flow path from the subterranean formation into the uncased portion of the wellbore, wherein the chemical packer composition comprises water, diutan, hydroxypropyl guar, and a first sealant composition comprising polyethyleneimine and a polymer comprising acrylamide and an acrylate ester and wherein the chemical packer composition has a pH greater than 9; allowing the chemical packer composition to form a plug, wherein a first portion of the wellbore below the plug is isolated from fluid communication with a second portion of the wellbore above the plug; flowing a second sealant composition from the end of the drill pipe into the influx flow path and a portion of the subterranean formation adjacent the influx flow path; allowing the second sealant composition to seal and close the influx flow path to further influx of water, gas, or both into the wellbore from the subterranean formation; and resuming drilling of the wellbore. An example of the second sealant composition is H2Zero® service, which is a porosity fill sealant for controlling unwanted fluid production that is commercially available from Halliburton Energy Services, Inc. In embodiments, when drill pipe is used in the method, the drilling of the wellbore can be resumed directly after the treatment of the water/gas influx zone.

Fluids used in servicing a wellbore may be lost to the subterranean formation while circulating the fluids in the wellbore. In particular, the fluids may enter the subterranean formation via lost circulation zones, for example, depleted zones, zones of relatively low pressure, zones having naturally occurring fractures, weak zones having fracture gradients exceeded by the hydrostatic pressure of the drilling fluid, and so forth. As a result, the service provided by such fluid is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

In embodiments, a method of treating a subterranean formation penetrated by a wellbore, comprises: drilling the wellbore with a drill bit connected to drill pipe; determining a location of a lost circulation zone in an uncased portion of the wellbore, wherein drilling fluid is undesirably diverted from inside the wellbore to the surrounding formation via the lost circulation zone; discontinuing drilling; introducing, via the drill pipe, a chemical packer composition into a first location, a second location, or both the first and the second locations, wherein the chemical packer composition comprises water, a suspending agent (e.g., diutan), a gelling agent (e.g., hydroxypropyl guar), and a first sealant composition (e.g., comprising a water-soluble copolymer and a cross-linker, wherein the water-soluble copolymer comprises acrylamide and an acrylate ester and the cross-linker comprises polyethyleneimine) and wherein the chemical packer composition has a pH greater than 9, wherein the first location is in a uncased portion of the wellbore below the location of the lost circulation zone, and the second location is in a uncased portion of the wellbore above the location of the lost circulation zone; allowing the chemical packer composition to form a plug or plugs, wherein a portion of the wellbore below each plug is isolated from fluid communication with a portion of the wellbore above the plug; flowing a second sealant composition from the end of the drill pipe into the lost circulation zone; allowing the second sealant composition to seal and close the lost circulation zone; and resuming drilling of the wellbore. An example of the second sealant composition is a particulated sealant composition of the type disclosed herein. Another example of the second sealant composition is a particulated sealant composition comprising particulate material in combination with a sealant composition comprising a water-soluble copolymer and a cross-linker, wherein the water-soluble copolymer comprises acrylamide and an acrylate ester and the cross-linker comprises polyethyleneimine. Another example of the second sealant composition is BackStop® service, which is based on a slurry formed by combining H2Zero® service and fluid loss control additives (e.g., particulate material) and is commercially available from Halliburton Energy Services, Inc. When pumped and squeezed, the fluid loss additives (e.g., particulate material) in the BackStop® fluid system will create a self-diverting filter cake, which can result in a uniform placement of the sealing polymer filtrate. Penetration of the sealant into the formation is typically less than 3 inches, allowing for selective re-perforation of the hydrocarbon zone to re-establish hydrocarbon production if additional reserves are identified in the treated zone. During the process, the H2Zero® polymer is used as make-up water for the slurry that will be squeezed into the formation, helping to create an effective shallow matrix seal after it sets. In embodiments, when drill pipe is used in the method (e.g., to spot the chemical packer(s) and the second sealant composition), the drilling of the wellbore can be resumed directly after the treatment of the lost circulation zone with no drill out or mill out required for wellbore cleanup.

In embodiments, a method of treating a subterranean formation penetrated by a wellbore, comprises: introducing a first amount of a chemical packer composition into the wellbore at a first location that is below a treatment interval in the wellbore, wherein the chemical packer composition comprises water, a suspending agent, a gelling agent, and a sealant composition and wherein the chemical packer composition has a pH greater than 9; introducing an amount of a treatment fluid into the wellbore at a second location that is above the first amount of the chemical packer composition and proximate the treatment interval; introducing a second amount of the chemical packer composition into the wellbore at a third location that is above the treatment fluid and above the treatment interval; and applying pressure to the wellbore to squeeze the treatment fluid into one or more flow paths present within the treatment interval, wherein the one or more flow paths provide fluid communication between the treatment interval of the wellbore and the subterranean formation. In some embodiments, the suspending agent comprises diutan, the gelling agent comprises hydroxypropyl guar, and the sealant composition comprises polyethyleneimine and a polymer comprising acrylamide and an acrylate ester. An example of the squeezed treatment fluid (e.g., a second sealant composition) is H2Zero® service, which is a porosity fill sealant for controlling unwanted fluid production that is commercially available from Halliburton Energy Services, Inc. In some embodiments, the squeezed treatment fluid (e.g., a second sealant composition) comprises cement, an epoxy resin, or combinations thereof. In embodiments, the cement can be Portland cement, pozzolana cement, gypsum cement, shale cement, acid/base cement, phosphate cement, high alumina content cement, slag cement, silica cement, high alkalinity cement, magnesia cement, or combinations thereof. The epoxy resins, also known as polyepoxides, are a class of reactive prepolymers and polymers which contain epoxide groups. The epoxy resins can cross-link (react) either with themselves through catalytic homopolymerisation, or with a wide range of co-reactants including polyfunctional amines, acids (and acid anhydrides), phenols, alcohols and thiols (usually called mercaptans). Such methods comprising two chemical packers/plugs on opposite ends of a volume or "slug" of treatment fluid (e.g., sealant) may be referred to as a "straddle-squeeze" method or service. The terms squeeze, squeeze job, squeeze treatment and the like generally refer to the application of hydraulic force via pump pressure to force a treatment fluid or slurry into a planned treatment zone.

In some straddle-squeeze embodiments, the first amount of the chemical packer composition is allowed to form a plug prior to introducing the second amount of the chemical packer composition into the wellbore. The plug may be formed from a thixotropic liquid that gains gel strength upon achieving a static (e.g., non-flowing) state at a desired location in the wellbore. In some embodiments, the chemical packer composition my further crosslink or otherwise chemically react to form a rigid gel. When pressure is applied to the wellbore to squeeze the treatment fluid into one or more flow paths present within the treatment interval, the plug can hold to the position in the wellbore, thus the treatment fluid can treat the specific zone as desired. Furthermore, the presence of the second amount of the chemical packer composition prevents slump or other misplacement of the treatment fluid relative to the zone of interest being treated prior to and/or during application of hydraulic pressure to conduct the squeeze.

A scenario where a straddle-squeeze method may be needed is in wells with multiple perforated and fractured zones. Over the life of such wells, one or more of the multiple perforated and fractured zones may develop an undesired influx of water, gas, or both. During workover operations in wells with multiple zones open to fluid flow, proper isolation is required to place the treatment in the desired zone. If it is desired to treat one or more zones to restrict water inflow, isolation is necessary in order to place the treatment only in the desired zones (e.g., zones having undesired inflow of water/gas). In these situations, it is not practical or perhaps feasible to set mechanical devices between the perforated zones due to the lack of space between perforations required to properly set a mechanical packer. In this scenario, mechanical packers cannot be used due to the complexity of the perforations and associated formation fractures around the wellbore wall. In this scenario, a chemical packer, which can be pumped down work pipe, can be the best option to isolate these zones. The chemical packer composition can be used in place of mechanical packers to isolate a perforated/fractured zone that needs treatment (e.g., to stop an undesired water/gas influx) from one or more perforated/fractured zones not needing treatment (or previously treated).

In embodiments, a portion of the wellbore below the first location comprises one or more flow paths (e.g., perforations and/or fractures) providing fluid communication between the portion of the wellbore below the first location and the formation. This may be caused by the high pressure of fluid in the formation around the portion of the wellbore resulting in an undesired water/gas influx. In embodiments, the one or more flow paths in the portion of the wellbore below the first location comprise a first plurality of perforations and associated formation fractures and wherein the flow paths present within the treatment interval comprise a second plurality of perforations and associated formation fractures. A perforation refers to a hole punched in the casing or a wellbore wall to connect the wellbore to the oil/gas reservoir. In embodiments, the wellbore is lined with casing and the first and second plurality of perforations penetrate the casing. In embodiments, the wellbore is lined with casing and wherein the one or more flow paths present within the treatment interval provide for fluid from an interior of the casing to an exterior of the casing and adjacent subterranean formation.

Casing is placed into a wellbore after the drilling operation. Casing of different sizes can be connected and used in the same wellbore. Through the life of the wellbore, there can be holes in the casing wall in various scenarios, causing undesired leaks or fluid communications across the casing wall. The leaks may cause loss of product, and/or undesired fluids in the product. In these scenarios, it may not practical or perhaps feasible to set mechanical devices at the location of a leak due to limited space, irregular shape of the wellbore, or different sizes of casing. In some embodiments, the specific location of a leak needing treatment may be in a horizontal or deviated portion of the wellbore where it is difficult or impossible to set one or more mechanical packers. Thus, another scenario where a straddle-squeeze treatment may be needed is to place a treatment fluid at a specific location having an undesired leak or fluid communication across the casing wall. In this case a chemical packer could be placed just beyond the leaking section, followed by the sealant, followed by the chemical packer. Using a chemical packer which will not slump would hold the sealant in place, again with no slumping, and allow it to be squeezed into the leaking casing. In some embodiments, the one or more flow paths comprise a leak in the casing. One example is a leaking casing collar, where two pieces of casing joins. A casing collar must provide sufficient mechanical strength, while providing isolation of the fluid on the two sides of the casing wall. A casing collar is one of the most common places where a leak occurs in the casing.

Another scenario where a straddle-squeeze treatment may be needed is in wells with casing pipe integrity issues where mechanical packers can't be used. Often during completion operations in wells with integrity issues like corrosion or with changes in casing ID, isolation is required to place the treatment in the desired zone. It is desirable to treat target zones, and isolation is necessary in order to place the treatment only in these zones. In these situations, it is not practical or perhaps feasible to set mechanical devices in wells with integrity issues. This is due to the irregular shape, or the size of the casing. Thus a chemical packer, which can be pumped down work pipe, can be the best option to isolate these zones. In embodiments, the one or more flow paths providing for an undesired water/gas influx are formed as a result of loss of structural integrity of the casing (e.g., casing corrosion). Casing can be structurally damaged at certain places where unexpected stress applies or where corrosion fluid contacts for a certain time. Without treatment, the loss of integrity of the casing can become worse. Therefore, isolation of the zones around the casing with integrity issue is needed.

Another scenario where a straddle-squeeze treatment may be needed is at a treatment location in a horizontal or deviated portion of a wellbore where a mechanical packer is difficult or impossible to use. For example, a wellbore can include three sections: a vertical section, a deviated (e.g., not vertical and not horizontal) section and a horizontal section. For treatment in the deviated and/or horizontal section of the wellbore, mechanical packers can be difficult to use due to lack of space and irregular shape of the wellbore. A chemical packer composition can be pumped to the specific location of the wellbore for use. In some straddle-squeeze embodiments, the first location, the second location, and the third location are located within a deviated and/or horizontal portion of the wellbore. In embodiments, the first and second amounts of the chemical packer composition are allowed to form plugs that straddle the treatment fluid and inhibit slumping of the treatment fluid due to the deviated and/or horizontal nature of the wellbore adjacent the treatment zone. The plugs formed by the first and the second amounts of the chemical packer composition can hold to the first and third locations of the wellbore (e.g., a deviated and/or horizontal portion of the wellbore) during the treatment, thus the treatment fluid can be straddled at the second location. This ensures the treatment is performed to the specific deviated and/or horizontal section in the wellbore.

The chemical packer composition has various advantages to many operations. The chemical packer composition is easier to pump and place into the desired location in the wellbore, since the delay in viscosity allows for lower pumping pressures and ease of placement, especially in small diameter coiled tubing. Another advantage is that compared to mechanical packers, the chemical packer composition can be used in large diameter, irregular open hole environments, and is not limited by availability of tools for specific hole sizes. The chemical packer composition is a "one size fits all" option that saves operational time and eliminates the problem of tool availability while the mechanical packers require a different tool for the diameter of each hole to be isolated. Another advantage is that the chemical packer composition can eliminate slumping in horizontal/deviated wellbores, and can minimize mixing with wellbore fluids which could dilute the chemical packer composition and compromise gel strength. The thixotropic behavior allows the chemical packer composition set in the lateral section of a horizontal wellbore, enabling a Newtonian fluid (e.g., a treatment fluid) to rest against the chemical packer without slumping. In a wellbore, the chemical packer composition can build up upon itself, fill up space over a substantial distance, and form a plug. Even when a pressure is applied, the plug can stop the fluid communication between the two sides of the plug and stay in place without significant moving. In embodiments, the pressure can be up to 4500 psig. A conduit (e.g., drill pipe or coiled tubing) can be pushed through the plug easily, and the plug can stay in place. Another advantage is that in an area with complex perforations, fractures, leaking casing and/or corroded pipe in a wellbore, where the treatment fluid could not be used successfully because of slumping, and mechanical packers cannot be used because of operational complexity and/or feasibility (e.g., lack of space), the chemical packer composition can form plugs around the location and straddle the treatment fluid in the area with complex perforations and/or fractures. Then the treatment fluid can be squeezed to isolate the area.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Figure 1:
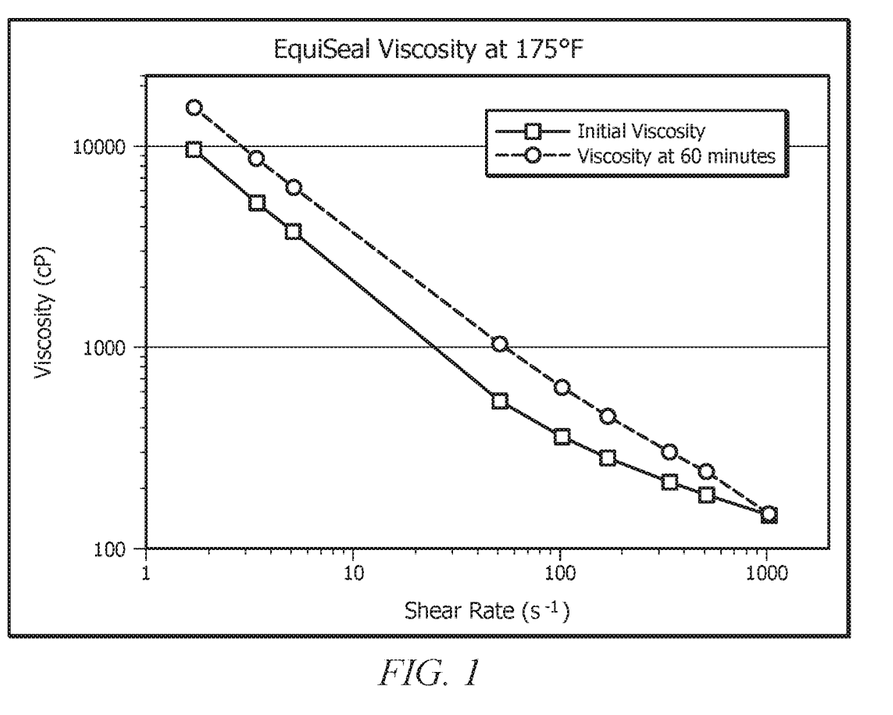
FIG. 1 shows the viscosity of an example of the chemical packer composition at 0 and 1 hour at various shear rates.

FIG. 1 shows the viscosity of an example of the chemical packer composition immediately after being prepared by mixing and its viscosity after 1 hour, during which time the chemical packer composition was heated to 175° F. At the 1 hour mark the lower shear viscosity tends to be higher than the initial viscosity, while at the higher shear rates they eventually coalesce. So the result is that the chemical packer composition remains pumpable at 1 hour after mixing, but when the shear is removed the viscosity is high.

Example 2

Figure 2:
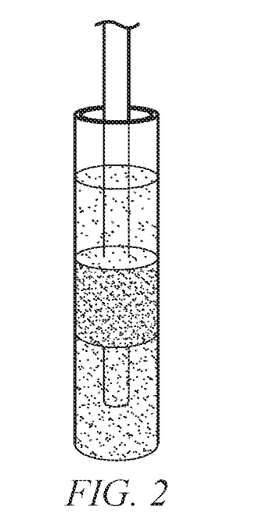
FIG. 2 shows the tubing passed through the plug formed by the chemical packer composition.

The ability of a chemical packer composition to resist movement inside the casing is necessary when drill pipe or coiled tubing is pushed through. Several tests have been performed to assess this property. In one test, as per the illustrations below, 7% KCl was placed into the bottom of a 1-inch diameter acrylic tube. The chemical packer composition as disclosed herein was then placed on top of this with a syringe and then topped with tap water. The tube was placed into a 130° F. water bath overnight to allow the sealant composition in the chemical packer composition to crosslink. The following day ¼ inch tubing was pushed into the plug formed by the chemical packer composition. The tubing passed through the plug easily, as shown in FIG. 2, and the plug stayed in place, rather than simply being pushed down to the bottom of the tube.

Example 3

Figure 3:
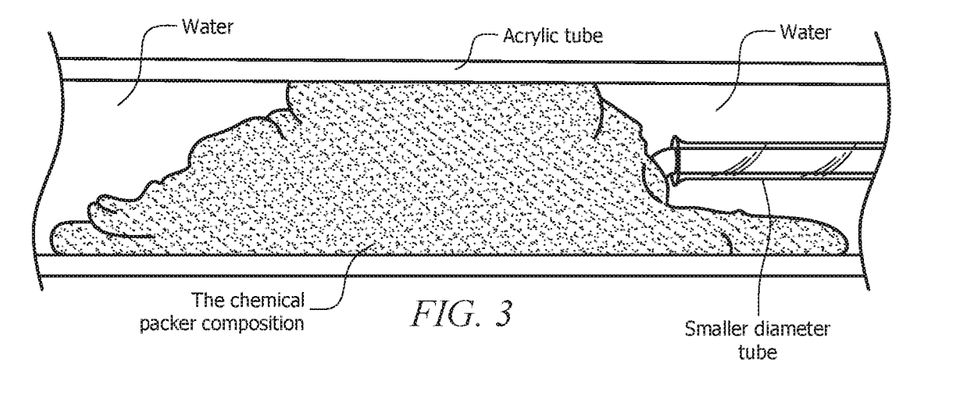
FIG. 3 shows the chemical packer composition exiting the small tube built up upon itself and filled the larger tube.

Another test was performed which illustrates the potential usefulness of the system for the scenario described above for treatment of a specific zone in a horizontal well, see FIG. 3. In this test, an acrylic tube was filled with water and a smaller diameter tube was inserted. The chemical packer composition as disclosed herein was pumped through the smaller tube and allowed to exit into the larger tube. This is meant to mimic placing the chemical packer composition into casing via coiled tubing. As shown, the chemical packer composition stayed in placed, building up upon itself and completely filling the larger tube. While some slumping did occur, the material did completely fill the larger tube over a substantial distance.

Example 4

Additional tests have been performed in order to quantify the pressure that a plug of the gel formed by the chemical packer composition can hold without moving or allowing fluid flow. Table 1 illustrates tests where the sealant composition in the chemical packer composition was gelled inside a 2 inch ID pipe and then water was pumped into the bottom of the pipe. As shown, increasing the length of the gel plug from 3.5 to 7 feet more than doubled the pressure at which water broke through the plug. Also note that in these tests, the pipe was open at the exit end and the plug did show some movement up and out of the pipe, but only a few inches. Also note that this test was run with the sealant composition of the chemical packer composition, not the chemical packer composition, but this is a representative test as the final gel quality is the same for both systems.

TABLE 1

Breakthrough test results of 3.5 and 7 ft gel columns

| Gel column length (ft) | Pressure (psig) | Time (min) | Result |
|---|---|---|---|
| 3.5 (clean pipe) | 25 | 20 | No leakage |
|  | 35 | 20 | No leakage |
|  | 45 | 20 | No leakage |
|  | 55 | — | Breakthrough |
| 7 (clean pipe) | 20 | 20 | No leakage |
|  | 40 | 20 | No leakage |
|  | 60 | 20 | No leakage |
|  | 80 | 20 | No leakage |
|  | 100 | 20 | No leakage |
|  | 120 | 20 | No leakage |
|  | 140 | — | Breakthrough |

Example 5

One additional test was done on a larger scale, with 500 feet of pipe. 4.5 inch pipe was centralized inside 7 inch pipe, with several holes in the middle of the 4.5 inch pipe. The chemical packer composition was pumped through the 4.5 inch pipe, exiting into the 4.5/7 inch annulus. A volume of the chemical packer composition calculated to fill 300 feet of the annulus was pumped. After allowing the chemical packer composition to gel, brine was pumped into one end of the annulus (entry end), with the other end (exit end, on the opposite side of the chemical packer composition plug) open. The entry end was pressured up to 4500 psi, with no fluid flow coming out the exit end. In addition, upon cutting open the pipe the plug had not appeared to move. This illustrates the ability of the chemical packer composition to act as a pressure seal, which is very important for the current application.

Additional Disclosure

A first embodiment, which is a method of treating a subterranean formation penetrated by a wellbore, comprising introducing a chemical packer composition into the wellbore, wherein the chemical packer composition comprises water, a suspending agent, a gelling agent, and a sealant composition and wherein the chemical packer composition has a pH greater than 9, and allowing the chemical packer composition to form a plug, wherein a portion of the wellbore below the plug is isolated from fluid communication with a portion of the wellbore above the plug.

A second embodiment, which is the method of the first embodiment wherein the suspending agent further comprises microfine particulate material, clay, a viscosifying polymer, or combinations thereof.

A third embodiment, which is the method of the second embodiment wherein the microfine particulate material comprises carbon black, lignite, brown coal, styrene-butadiene rubber latexes, polyvinyl alcohol latexes, acetate latexes, acrylate latexes, precipitated silica, fumed/pyrogenic silica, surfactant micelles, or combinations thereof.

A fourth embodiment, which is the method of the second embodiment wherein the clay comprises bentonite, attapulgite, kaolinite, meta kaolinite, hectorite and sepiolite, or combinations thereof.

A fifth embodiment, which is the method of the second embodiment wherein the viscosifying polymer comprises a copolymer of 2-acrylamido-2-methylpropane sulfonic acid and N,N-dimethylacrylamide, carragenan, scleroglucan, xanthan gum, guar gum, hydroxypropylguar, hydroxyethylcellulose, carboxymethylhydroxyethylcellulose, welan gum, succinoglycan, copolymers or terpolymers of 2-acrylamido-2-methylpropane sulfonate, N,N-dimethylacrylamide, acrylic acid, and vinyl acetate; copolymers of acrylamide and trimethylammoniumethylmethacrylate, trimethylammoniumethyl acrylate salts; copolymers of 2-acrylamido-2-methylpropane sulfonate and acrylamide, or combinations thereof.

A sixth embodiment, which is the method of the second or the fifth embodiment wherein the suspending agent has a molecular weight in a range of equal to or greater than 0.5 MM Da to equal to or less than 15 MM Da.

A seventh embodiment, which is the method of the first embodiment wherein the suspending agent comprises diutan.

An eighth embodiment, which is the method of any of the first through the seventh embodiments wherein suspending agent is present in the chemical packer composition in an amount of from about 20 lb/1000 gal to about 100 lb/1000 gal, alternatively from about 30 lb/1000 gal to about 90 lb/1000 gal, or alternatively from about 30 lb/1000 gal to about 70 lb/1000 gal, based on total weight of the chemical packer composition.

A ninth embodiment, which is the method of any of the first through the eighth embodiments wherein the gelling agent comprises hydroxypropyl guar (HPG).

A tenth embodiment, which is the method of the seventh embodiment wherein the gelling agent comprises hydroxypropyl guar (HPG).

An eleventh embodiment, which is the method of any of the first through the tenth embodiments wherein the gelling agent has a molecular weight in a range of equal to or greater than 1.2 MM Da to equal to or less than 5 MM Da.

A twelfth embodiment, which is the method of any of the first through the eleventh embodiments wherein the gelling agent is present in an amount in a range of from about 20 lb/1000 gal to about 200 lb/1000 gal, alternatively from about 30 lb/1000 gal to about 180 lb/1000 gal, alternatively from about 40 lb/1000 gal to about 160 lb/1000 gal, alternatively from about 50 lb/1000 gal to about 160 lb/1000 gal, alternatively from about 50 lb/1000 gal to about 150 lb/1000 gal, alternatively from about 60 lb/1000 gal to about 140 lb/1000 gal based on the total weight of the chemical packer composition.

A thirteenth embodiment, which is the method of any of the first through the twelfth embodiments wherein the sealant composition comprises sodium silicate.

A fourteenth embodiment, which is the method of the thirteenth embodiment wherein the amount of the sodium silicate present in the chemical packer composition is in a range of from about 15% to about 75% by total volume of the chemical packer composition, alternatively from about 33% to about 67%, alternatively from about 40% to about 60%.

A fifteenth embodiment, which is the method of any of the first through the twelfth embodiments wherein the sealant composition comprises colloidal silica.

A sixteenth embodiment, which is the method of the fifteenth embodiment wherein the amount of the colloidal silica present in the chemical packer composition is in a range of from about 25% to about 95% by total volume of the chemical packer composition, alternatively from about 33% to about 67%, alternatively from about 40% to about 60%.

A seventeenth embodiment, which is the method of any of the first through the twelfth embodiments wherein the sealant composition comprises a water-soluble copolymer and a cross-linker.

An eighteenth embodiment, which is the method of any of the first through the seventeenth embodiments wherein the sealant composition may be used at a temperature in the range of from about 80° F. to about 250° F.; alternatively from about 90° F. to about 230° F.; alternatively from about 100° F. to about 220° F.

A nineteenth embodiment, which is the method of the seventeenth embodiment wherein the water-soluble copolymer comprises at least one non-acidic ethylenically unsaturated polar monomer and at least one copolymerisable ethylenically unsaturated ester.

A twentieth embodiment, which is the method of the nineteenth embodiment wherein the non-acidic ethylenically unsaturated polar monomer comprises acrylamide.

A twenty-first embodiment, which is the method of any of the nineteenth and the twentieth embodiments wherein the copolymerisable ethylenically unsaturated ester is formed from a hydroxyl compound and an ethylenically unsaturated carboxylic acid selected from acrylic, methacrylic, crotonic and cinnamic acids.

A twenty-second embodiment, which is the method of any of the nineteenth through the twenty-first embodiments wherein the copolymerisable ethylenically unsaturated ester comprises an acrylate ester.

A twenty-third embodiment, which is the method of the seventeenth embodiment wherein the water-soluble copolymer has a weight average molecular weight of at least 50 k Daltons (Da).

A twenty-fourth embodiment, which is the method of any of the seventeenth through the twenty-third embodiments wherein the water-soluble copolymer is present in the chemical packer composition in an amount of from about 2 wt. % to about 20 wt. % based on the total weight of the chemical packer composition, alternatively from about 4 wt. % to about 16 wt. %, alternatively from about 5 wt. % to about 10 wt. %.

A twenty-fifth embodiment, which is the method of any of the seventeenth through the twenty-fourth embodiments wherein the cross-linker comprises a polyalkyleneimine, a poly-functional aliphatic amine, an aralkylamine or a heteroaralkylamine, or any combination thereof.

A twenty-sixth embodiment, which is the method of any of seventeenth through the twenty-fifth embodiments wherein the cross-linker comprises polyethyleneimine.

A twenty-seventh embodiment, which is the method of the tenth embodiment wherein the sealant composition comprises a water-soluble copolymer and a cross-linker and wherein the water-soluble copolymer comprises acrylamide and an acrylate ester and the cross-linker comprises polyethyleneimine.

A twenty-eighth embodiment, which is the method of any of the seventeenth through the twenty-sixth embodiments wherein the cross-linker has a molecular weight in a range of equal to or greater than 10 k Daltons (Da) to equal to or less than 5 MM Da.

A twenty-ninth embodiment, which is the method of any of the seventeenth through the twenty-eighth embodiments wherein the cross-linker is present in the chemical packer composition in an amount of from about 0.1 wt. % to about 10 wt. % based on the total weight of the chemical packer composition, alternatively from about 0.2 wt. % to about 9 wt. %, alternatively from about 0.5 wt. % to about 6 wt. %.

A thirtieth embodiment, which is the method of any of the seventeenth through the twenty-ninth embodiments wherein the sealant composition further comprises a particulate material.

A thirty-first embodiment, which is the method of any of the first through the thirtieth embodiments wherein the water is present in the chemical packer composition in an amount of from about 70 wt. % to about 97 wt. % based on the total weight of the chemical packer composition, alternatively from about 75 wt. % to about 95 wt. %, alternatively from about 80 wt. % to about 90 wt. %.

A thirty-second embodiment, which is the method of any of the first through the thirty-first embodiments wherein the chemical packer composition is thixotropic.

A thirty-third embodiment, which is the method of any of the first through the thirty-second embodiments wherein introducing the chemical packer composition into the wellbore comprising pumping the chemical packer composition into the wellbore and wherein the chemical packer composition has a viscosity in a range of from about 30 cp to about 500 cp during the pumping.

A thirty-fourth embodiment, which is the method of the thirty-third embodiment wherein upon cessation of the pumping, the chemical packer composition forms a gel within about 30, 60, 90, 120, 150, 180, 210, or 240 seconds from the cessation of the pumping.

A thirty-fifth embodiment, which is the method of the thirty-fourth embodiment wherein the gel crosslinks to form a rigid gel within about 60 minutes from the cessation of the pumping.

A thirty-sixth embodiment, which is a method of treating a subterranean formation penetrated by a wellbore, comprising introducing a chemical packer composition into the wellbore, wherein the chemical packer composition comprises water, a suspending agent, a gelling agent, and a first sealant composition and wherein the chemical packer composition has a pH greater than 9, allowing the chemical packer composition to form a plug, wherein a first portion of the wellbore below the plug is isolated from fluid communication with a second portion of the wellbore above the plug, penetrating the plug with a conduit, and flowing a treatment fluid from the conduit into the first portion of the wellbore.

A thirty-seventh embodiment, which is the method of the thirty-sixth embodiment wherein the suspending agent comprises diutan, the gelling agent comprises hydroxypropyl guar, and the first sealant composition comprises polyethyleneimine and a polymer comprising acrylamide and an acrylate ester.

A thirty-eighth embodiment, which is the method of the thirty-seventh embodiment wherein the conduit is drill pipe or coiled tubing.

A thirty-ninth embodiment, which is the method of the thirty-eighth embodiment wherein the first portion of the wellbore is uncased.

A fortieth embodiment, which is the method of the thirty-ninth embodiment wherein the first portion of the wellbore comprises a flow path from the subterranean formation into the wellbore for the influx of water, gas, or both from the subterranean formation into the wellbore.

A forty-first embodiment, which is the method of the fortieth embodiment wherein the treatment fluid comprises a second sealant composition and the second sealant composition is further flowed into the flow path for the influx of water, gas, or both.

A forty-second embodiment, which is the method of the forty-first embodiment wherein the second sealant composition may be the same or different than the first sealant composition.

A forty-third embodiment, which is the method of the forty-second embodiment further comprising allowing the second sealant composition to seal and close the flow path to further influx of water, gas, or both into the wellbore.

A forty-fourth embodiment, which is a method of treating a subterranean formation penetrated by a wellbore, comprising drilling the wellbore with a drill bit connected to drill pipe, determining a location of an influx flow path from the subterranean formation into an uncased portion of the wellbore providing for an undesirable influx of water, gas, or both from the subterranean formation into the uncased portion of the wellbore, upon discontinuing drilling, introducing, via the drill pipe, a chemical packer composition into at least a portion of the uncased portion of the annular space between the wellbore wall and the outer surface of the drill pipe above the location of the influx flow path from the subterranean formation into the uncased portion of the wellbore, wherein the chemical packer composition comprises water, diutan, hydroxypropyl guar, and a first sealant composition and wherein the chemical packer composition has a pH greater than 9, allowing the chemical packer composition to form a plug, wherein a first portion of the wellbore below the plug is isolated from fluid communication with a second portion of the wellbore above the plug, flowing a second sealant composition from the end of the drill pipe into the influx flow path and a portion of the subterranean formation adjacent the influx flow path, allowing the second sealant composition to seal and close the influx flow path to further influx of water, gas, or both into the wellbore from the subterranean formation, and resuming drilling of the wellbore.

A forty-fifth embodiment, which is a method of treating a subterranean formation penetrated by a wellbore, comprising drilling the wellbore with a drill bit connected to drill pipe, determining a location of a lost circulation zone in an uncased portion of the wellbore, discontinuing drilling, introducing, via the drill pipe, a chemical packer composition into a first location, a second location, or both the first and the second locations, wherein the chemical packer composition comprises water, a suspending agent, a gelling agent, and a first sealant composition and wherein the chemical packer composition has a pH greater than 9, wherein the first location is in a uncased portion of the wellbore below the location of the lost circulation zone, and the second location is in a uncased portion of the wellbore above the location of the lost circulation zone, allowing the chemical packer composition to form a plug or plugs, wherein a portion of the wellbore below each plug is isolated from fluid communication with a portion of the wellbore above the plug, flowing a second sealant composition from the end of the drill pipe into the lost circulation zone, allowing the second sealant composition to seal and close the lost circulation zone, and resuming drilling of the wellbore.

A forty-sixth embodiment, which is a method of treating a subterranean formation penetrated by a wellbore, comprising introducing a first amount of a chemical packer composition into the wellbore at a first location that is below a treatment interval in the wellbore, wherein the chemical packer composition comprises water, a suspending agent, a gelling agent, and a sealant composition and wherein the chemical packer composition has a pH greater than 9, introducing an amount of a treatment fluid into the wellbore at a second location that is above the first amount of the chemical packer composition and proximate the treatment interval, introducing a second amount of the chemical packer composition into the wellbore at a third location that is above the treatment fluid and above the treatment interval, and applying pressure to the wellbore to squeeze the treatment fluid into one or more flow paths present within the treatment interval, wherein the one or more flow paths provide fluid communication between the treatment interval of the wellbore and the subterranean formation.

A forty-seventh embodiment, which is the method of the forty-sixth embodiment wherein the first amount of the chemical packer composition is allowed to form a plug (e.g., crosslink and form a rigid gel) prior to introducing the second amount of the chemical packer composition into the wellbore.

A forty-eighth embodiment, which is the method of the forty-seventh embodiment wherein a portion of the wellbore below the first location comprises one or more flow paths (e.g., perforations and/or fractures) providing fluid communication between the portion of the wellbore below the first location and the formation.

A forty-ninth embodiment, which is the method of the forty-eighth embodiment wherein the one or more flow paths in the portion of the wellbore below the first location comprise a plurality of perforations and associated formation fractures and wherein the flow paths present within the treatment interval comprise a second plurality of perforations and associated formation fractures.

A fiftieth embodiment, which is the method of the forty-ninth embodiment wherein the wellbore is lined with casing and the first and second plurality of perforations penetrate the casing.

A fifty-first embodiment, which is the method of the forty-sixth embodiment wherein the wellbore is lined with casing and wherein the one or more flow paths present within the treatment interval provide for fluid from an interior of the casing to an exterior of the casing and adjacent subterranean formation.

A fifty-second embodiment, which is the method of the fifty-first embodiment wherein the one or more flow paths comprise a leak in the casing (e.g., a leaking casing collar).

A fifty-third embodiment, which is the method of any of the fifty-first and the fifty-second embodiments wherein the one or more flow paths are formed as a result of loss of structural integrity of the casing (e.g., casing corrosion).

A fifty-fourth embodiment, which is the method of the forty-sixth embodiment wherein the first location, the second location, and the third location are located within a horizontal portion of the wellbore.

A fifty-fifth embodiment, which is the method of any of the forty-sixth through the fifty-fourth embodiments wherein the first and second amounts of the chemical packer composition are allowed to form plugs that straddle the treatment fluid and inhibit slumping of the treatment fluid.

A fifty-sixth embodiment, which is the method of any of the forty-sixth through the fifty-fifth embodiments wherein the suspending agent comprises diutan, the gelling agent comprises hydroxypropyl guar, and the sealant composition comprises polyethyleneimine and a polymer comprising acrylamide and an acrylate ester.

A fifty-seventh embodiment, which is the method of any of the forty-sixth through the fifty-sixth embodiments wherein the treatment fluid comprises cement, an epoxy resin, or combinations thereof.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of treating a subterranean formation penetrated by a wellbore, comprising:
    placing a tubular having an outlet into a non-vertical portion of the wellbore, wherein the tubular provides a flow path from the surface to the outlet;
    introducing a chemical packer composition into a non-vertical portion of the wellbore via the tubular outlet, wherein the chemical packer composition comprises water, a suspending agent, a gelling agent, and a sealant composition and wherein the chemical packer composition has a pH greater than 9, wherein the chemical packer maintains contact with a 360° surface of the non-vertical portion of the wellbore; and
    allowing the chemical packer composition to form a plug, wherein a portion of the wellbore below the plug is isolated from fluid communication via the wellbore with a portion of the wellbore above the plug.

2. The method of claim 1 wherein the suspending agent comprises diutan.

3. The method of claim 2 wherein the gelling agent comprises hydroxypropyl guar (HPG).

4. The method of claim 3 wherein the sealant composition comprises a water-soluble copolymer and a cross-linker and wherein the water-soluble copolymer comprises acrylamide and an acrylate ester and the cross-linker comprises polyethyleneimine.

5. The method of claim 1 wherein the tubular comprises coiled tubing.

6. The method of claim 1 wherein the non-vertical portion of the wellbore is cased.

7. A method of treating a subterranean formation penetrated by a wellbore, comprising:
    introducing a chemical packer composition into the wellbore, wherein the chemical packer composition comprises water, a suspending agent, a gelling agent, and a first sealant composition and wherein the chemical packer composition has a pH greater than 9;
    allowing the chemical packer composition to form a plug, wherein a first portion of the wellbore below the plug is isolated from fluid communication with a second portion of the wellbore above the plug;
    penetrating the plug with a conduit; and
    flowing a treatment fluid from the conduit into the first portion of the wellbore.

8. The method of claim 7 wherein the suspending agent comprises diutan, the gelling agent comprises hydroxypropyl guar, and the first sealant composition comprises polyethyleneimine and a polymer comprising acrylamide and an acrylate ester.

9. The method of claim 8 wherein the conduit is drill pipe or coiled tubing.

10. The method of claim 9 wherein the first portion of the wellbore is uncased.

11. A method of treating a subterranean formation penetrated by a wellbore, comprising:
    introducing a first amount of a chemical packer composition into the wellbore at a first location that is below a treatment interval in the wellbore, wherein the chemical packer composition comprises water, a suspending agent, a gelling agent, and a sealant composition and wherein the chemical packer composition has a pH greater than 9;
    introducing an amount of a treatment fluid into the wellbore at a second location that is above the first amount of the chemical packer composition and proximate the treatment interval;
    introducing a second amount of the chemical packer composition into the wellbore at a third location that is above the treatment fluid and above the treatment interval; and
    applying pressure to the wellbore to squeeze the treatment fluid into one or more flow paths present within the treatment interval, wherein the one or more flow paths provide fluid communication between the treatment interval of the wellbore and the subterranean formation.

12. The method of claim 11 wherein the first location, the second location, and the third location are located within a horizontal portion of the wellbore.

13. The method of claim 11 wherein the first and second amounts of the chemical packer composition are allowed to form plugs that straddle the treatment fluid and inhibit slumping of the treatment fluid.

14. The method of claim 11 wherein the suspending agent comprises diutan, the gelling agent comprises hydroxypropyl guar, and the sealant composition comprises polyethyleneimine and a polymer comprising acrylamide and an acrylate ester.

15. The method of claim 11 wherein the treatment fluid comprises cement, an epoxy resin, or combinations thereof.

16. The method of claim 11 wherein the first amount of the chemical packer composition is allowed to form a plug prior to introducing the second amount of the chemical packer composition into the wellbore.

17. The method of claim 16 wherein the first amount of the chemical packer composition crosslinks to form a rigid gel plug.

18. The method of claim 16 wherein a portion of the wellbore below the first location comprises one or more flow paths providing fluid communication between the portion of the wellbore below the first location and the formation.

19. The method of claim 18 wherein the one or more flow paths comprise perforations, fractures, or both.

20. The method of claim 18 wherein the one or more flow paths in the portion of the wellbore below the first location comprise a plurality of perforations and associated formation fractures and wherein the flow paths present within the treatment interval comprise a second plurality of perforations and associated formation fractures.

21. The method of claim 20 wherein the wellbore is lined with casing and the first and second plurality of perforations penetrate the casing.

22. The method of claim 11 wherein the wellbore is lined with casing and wherein the one or more flow paths present within the treatment interval provide for fluid from an interior of the casing to an exterior of the casing and adjacent subterranean formation.

23. The method of claim 22 wherein the one or more flow paths comprise a leak in the casing.

24. The method of claim 23 wherein the leak in the casing comprises a leaking casing collar.

25. The method of claim 22 wherein the one or more flow paths are formed as a result of loss of structural integrity of the casing.

26. The method of claim 25 wherein the one or more flow paths are formed as a result of casing corrosion.

\* \* \* \* \*